(12) United States Patent
Langer et al.

(10) Patent No.: US 7,806,597 B2
(45) Date of Patent: Oct. 5, 2010

(54) WHEEL BEARING ARRANGEMENT WITH FACE SPLINE

(75) Inventors: Roland Langer, Schwanfeld (DE); Peter Niebling, Bad Kissingen (DE); Ernst Masur, Untereuerheim (DE)

(73) Assignee: Schaeffler KG, Herzogenaurach (DE)

( * ) Notice: Subject to any disclaimer, the term of this patent is extended or adjusted under 35 U.S.C. 154(b) by 507 days.

(21) Appl. No.: 11/817,605

(22) PCT Filed: Feb. 24, 2006

(86) PCT No.: PCT/DE2006/000342
§ 371 (c)(1), (2), (4) Date: Nov. 7, 2007

(87) PCT Pub. No.: WO2006/092121
PCT Pub. Date: Sep. 8, 2006

(65) Prior Publication Data
US 2008/0159677 A1 Jul. 3, 2008

(30) Foreign Application Priority Data
Mar. 4, 2005 (DE) .................. 10 2005 009 935

(51) Int. Cl.
*F16C 19/18* (2006.01)
(52) U.S. Cl. ..................................... 384/544

(58) Field of Classification Search ................ 384/544, 384/589, 504, 510, 537; 464/178, 906; 301/105.1
See application file for complete search history.

(56) References Cited

U.S. PATENT DOCUMENTS

| | | | |
|---|---|---|---|
| 4,047,770 A | | 9/1977 | Korenhof et al. |
| 4,352,528 A | * | 10/1982 | Guimbretiere .............. 384/512 |
| 4,460,058 A | * | 7/1984 | Welschof et al. ........... 464/906 |
| 4,493,388 A | * | 1/1985 | Welschof et al. ........... 384/544 |
| 4,893,960 A | * | 1/1990 | Beier et al. ................... 403/24 |
| 5,607,241 A | * | 3/1997 | Fukumura ................... 384/537 |
| 5,806,936 A | * | 9/1998 | Guimbretiere ........... 301/105.1 |
| 6,022,275 A | * | 2/2000 | Bertetti ....................... 464/178 |
| 6,146,022 A | | 11/2000 | Sahashi et al. |

FOREIGN PATENT DOCUMENTS

| | | |
|---|---|---|
| DE | 31 16 720 XY | 10/1982 |
| DE | 36 04 630 A | 8/1987 |
| DE | 36 36 243 Y | 5/1988 |

* cited by examiner

*Primary Examiner*—Thomas R Hannon
(74) *Attorney, Agent, or Firm*—Lucas & Mercanti, LLP

(57) ABSTRACT

A wheel bearing arrangement which as at least two rows of rolling bodies which are used to bear a wheel hub which can be driven by a drive element and which includes a wheel bearing arrangement. The wheel hub is connected to the drive element. The wheel hub and the drive element engage together in a positive fit via a pair of face splines which correspond to each other.

19 Claims, 1 Drawing Sheet

WHEEL BEARING ARRANGEMENT WITH FACE SPLINE

FIELD OF THE INVENTION

The invention relates to a wheel bearing arrangement having at least two rows of rolling bodies for mounting a wheel hub which can be driven with the wheel bearing by a drive element, the wheel hub being connected to the drive element, and the wheel hub and the drive element engaging into one another in a form-fitting manner by means of a pair of face splines which correspond to one another.

BACKGROUND OF THE INVENTION

A wheel bearing arrangement of this type and the function of the toothing system are described in detail in DE 31 16 720 C1. The face spline can be introduced, for example, by manufacturing without cutting. The connection saves installation space and permits the transmission of relatively high moments which have limits set on them, however, on account of the dimensions of the wheel bearing arrangements.

Moreover, the known wheel bearing units have a relatively high weight and a relatively low bearing rigidity. The bearing rigidity is the resistance which the unit applies counter to elastic deflections which are caused by loadings. A tilting rigidity results from the bearing rigidity, which tilting rigidity results from the ratio of moments from loadings with respect to the tilting angle in the bearing, for example in Nm/°. This tilting rigidity is lower, the more the bearing tilts under loadings, that is to say the greater the tilting angle is with the same loading. The loadings are the loadings which, in the operating state of a vehicle, act substantially on the vehicle wheel and the associated wheel suspension system. The lower the bearing rigidity, the more the loadings bring about tilting of the wheel system which has a disadvantageous effect on the driving behavior of the vehicle, in particular when driving around bends, and on the wear of the brake and the function of the brake.

SUMMARY OF THE INVENTION

It is therefore the object of the invention to provide a rigid wheel bearing arrangement for transmitting high moments.

The object of the invention is achieved on the one hand by the fact that, at least on the face spline on the wheel bearing arrangement side, a ratio of the diameter (VTK) of a toothing pitch circle with respect to the tooth number (Z) of said face spline is at least 0.7:

$$0.7 \leq (VTK/Z)$$

Preferably:

$$0.7 \leq (VTK/Z) \leq 1.4$$

The toothing pitch circle (VTK) is a difference from the radial external diameter (VDA) of the toothing system and from the tooth width (ZB) of the teeth which are formed the furthest radially to the outside:

$$VTK = VDA - ZB$$

The external diameter (VDA) is an imaginary circle about the rotational axis of the wheel bearing arrangement, which imaginary circle touches the teeth of the toothing system radially on the outside at the tooth root. The teeth which are spaced apart circumferentially with respect to one another extend away from the circle with the tooth width (ZB) radially to the rotational axis or else in a manner which is oriented to the inside and obliquely with respect to said rotational axis.

The external diameter VDA of the toothing system is the diameter of an imaginary circle, by which the teeth which lie furthest radially on the outside are reached around radially on the outside. Accordingly, the application of the invention can also be applied to toothing systems which have teeth of different tooth width ZB or which are provided with teeth of identical tooth width ZB which are offset radially with respect to one another. The tooth width ZB describes the spacing at the level of the tooth root between the radially outer boundary face and the radially inner boundary face of the respective tooth. The tooth root is described by the boundary/contour line, at which the tooth protrudes from or merges into the material of the component, on which the toothing system is formed. This boundary therefore extends in the tooth gaps of circumferentially adjacent teeth between the radially deepest points of the gaps and, from the gap, radially to the outside and radially to the inside of the tooth to the next tooth gap. The tooth number Z is the overall number of circumferentially adjacent teeth of the toothing system, as a rule having a uniform pitch.

All dimensions, ratios and calculation values which are considered by the invention are nominal values without consideration of manufacturing-related and other dimensional tolerances.

As a rule, the invention relates to those wheel bearing arrangements, in which the wheel hub and the drive element can be connected to one another and can be released from one another again. In this "classic" case, the two components engage into one another in a form-fitting manner without play via the face splines and are clamped axially against one another by way of a central screw. It is also conceivable that the form-fitting connection by means of the face splines is secured in a nonreleasable manner by a material-to-material fit or in another way. As a rule, the connection at the toothing systems is designed to be self-locking.

On the other hand, the object is also achieved by the fact that, at least on one face spline of the pair, the diameter (TK) of a pitch circle of one of the rows of rolling bodies is at most as great as or smaller than 1.7 times the diameter (VTK) of a toothing pitch circle of said face spline:

$$TK \leq (1.7 \cdot VTK)$$

The pitch circle is an imaginary circle which extends concentrically with respect to the rotational axis and connects the rotational centers of the rolling bodies to one another circumferentially.

There is provision with one refinement of the invention for the diameter (TK) of a pitch circle of at least one of the rows of rolling bodies to be at least four times as great as or larger than the diameter (DKU) of the rolling bodies of identical size of said row:

$$TK \geq (4 \cdot DKU)$$

The pitch circle is an imaginary circle which is concentric with respect to the rotational axis of the wheel bearing arrangement and connects the centers of the rolling bodies of the relevant row to one another circumferentially.

On the drive side, the face spline is formed, for example, on a joint (an articulation bell) or on a shaft stub. On the side of the wheel bearing arrangement, the face spline is provided on the wheel hub or on an inner ring which is seated on the wheel hub. As an alternative, the face spline is formed on a collar of the wheel hub, which collar is also called a rolling rivet flange. The collar is deformed radially to the outside by plastic deformation from a hollow section of preferably rotationally symmetrical configuration of a preassembly state of the wheel hub. The wheel bearing arrangement is held within itself by way of the collar and is also axially clamped as a rule on account of the angular contact bearing arrangement. In its initial state before the collar is folded over, the section is preferably configured to be hollow-cylindrical or externally cylindrical and, at the same time, internally conical on the inside or of any other desired design.

In the context of the invention, this collar is then designed in such a way and is provided with a face spline, such that the ratio $0.7 \leqq (VTK/Z)$ is realized. Furthermore, there is provision by way of refinements of the invention that the tooth width (ZB) is at least as great as, or is greater than but not more than 2.5 times, the radial wall thickness (SQ) at the radially narrowest point of the hollow section, radially below the inner ring:

$$1 \geqq (ZB/SQ) \leqq 2.5$$

A further refinement of the invention provides for the tooth width (ZB) to be at most twice as wide as the collar at its narrowest point, but at least as wide as the collar is axially at its narrowest point. The collar width NB extends axially from an end side of the inner ring: the tooth width ZB is therefore perpendicular with respect to the collar width NB.

$$2 \cdot NB \geqq ZB \geqq NB$$

The end side of the inner ring is a side which faces in the direction of the pair.

Furthermore, there is provision for the collar at its narrowest point with the dimension NB to be axially at least 0.8 times as wide as the thickness SQ of the wall:

$$NB \geqq (0.8 \cdot SQ)$$

As an alternative, there is provision for the diameter (VTK) of the toothing pitch circle to be at least seven times as great as the collar is axially wide at its narrowest point with the dimension NB:

$$VTK \geqq (7 \cdot NB)$$

Furthermore, the following refinements of the invention are provided:

The diameter VTK of the toothing pitch circle corresponds to at least the internal diameter IRD of the inner ring or is greater than the latter.

$$VTK \geqq IRD.$$

The dimension IRB of the shoulder of the inner ring from the transition from the raceway to the cylindrical casing face on the outside is greater than the width NB of the collar at its axially narrowest point:

$$IRB \geqq NB.$$

Further refinements of the invention provide combinations of the above-mentioned features in any desired number and arrangement.

A wheel bearing unit according to the invention provides a narrow wheel bearing unit which, however, has a large diameter and is therefore of rigid configuration as a result of a large ball pitch circle. As a result, the pitch circle of the toothing system is raised. As a result, more teeth can be arranged on the circumferential side. The toothing system can be loaded by higher drive moments.

Figure 1:
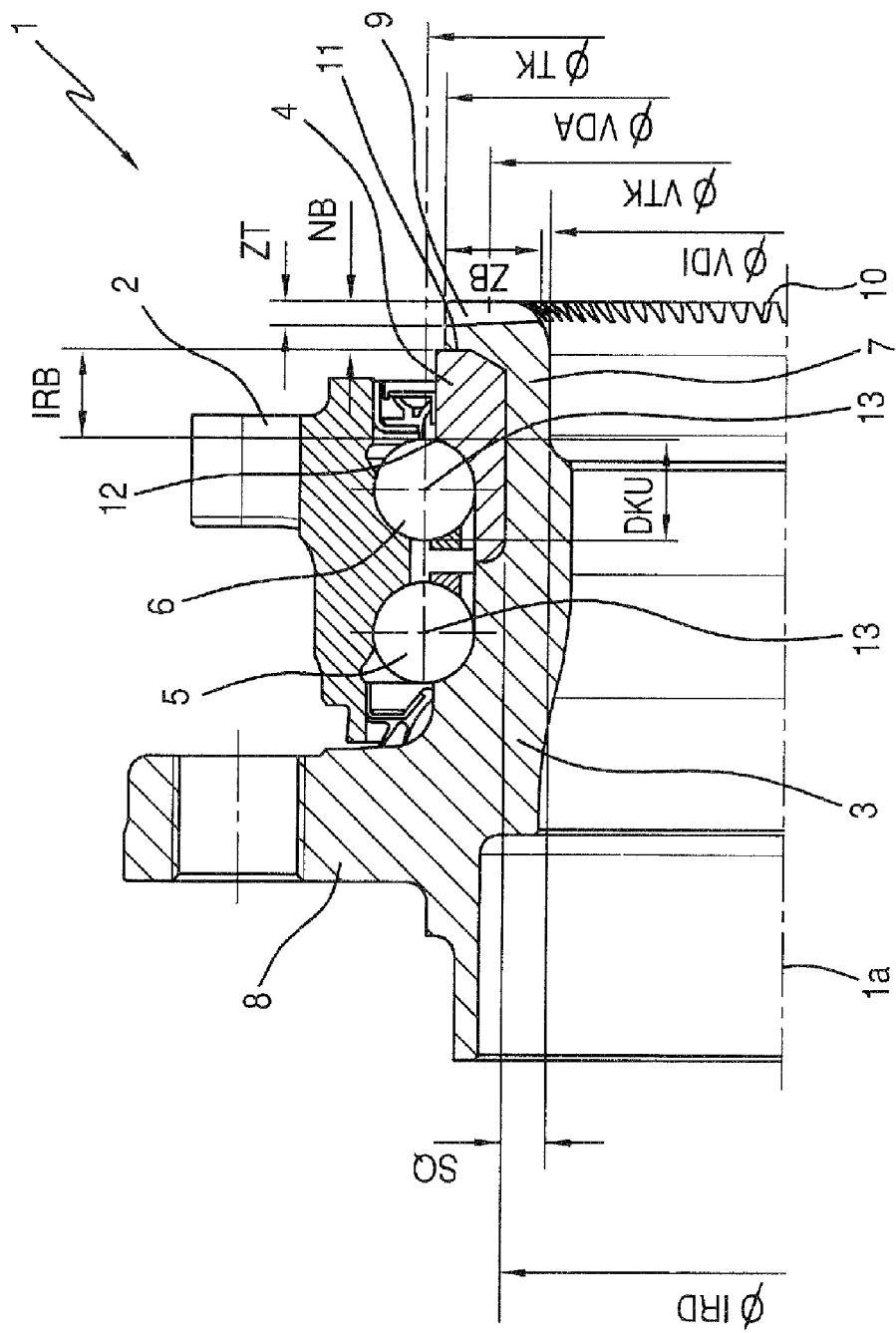
FIG. 1 shows one exemplary embodiment of the invention. The wheel bearing arrangement 1 is formed from a flange 2 on the vehicle side, a wheel hub 3 having a wheel flange 8, from an inner ring 4 and from two rows 5, 6 of rolling bodies. The balls of both of the rows 5 and 6 in this case are arranged with the pitch circle of diameter TK about the rotational axis 1a of the wheel bearing unit 1. The pitch circle extends through the centers 13 of the balls.

The inner ring 4 is seated on a hollow section 7 having the wall thickness SQ. The section 7 has the internal diameter VDI. A collar 9 is formed integrally with the section 7 of the wheel hub 3. The collar 9 protrudes radially from the section 7 and, on the outside, has the external diameter VDA. The wheel bearing arrangement 1, an angular contact ball bearing arrangement in this case, is prestressed by way of the collar 9. For this purpose, the collar 9 bears axially against an end side 11 of the inner ring 4, which end side 11 faces in the direction of the face spline 10. The width IRB of the shoulder of the inner ring 4 is described by the axial spacing between the end side 11 and the transition 12 to the inner ring raceway.

A face spline 10 which is delimited on the outside by the external diameter VDA of the toothing system 10 is formed on the collar. The face spline is provided for engagement into an accordingly corresponding face spline of the drive element (not shown). In this exemplary embodiment, the external diameter of the face spline 10 is therefore as large as the external diameter of the collar 9. Embodiments are also conceivable, in which the external diameter of the collar is greater than the external diameter of the face spline. The geometry of the face spline is determined by the external diameter VDA and the tooth width ZB, so that the diameter VTK of the pitch circle of the face spline 10 results. The axially oriented tooth depth ZT is also determined by the axial width NB of the collar 9.

List of Designations

1 Wheel bearing arrangement
1a Rotational axis
2 Flange
3 Wheel hub
4 Inner ring
5 Row
6 Row
7 Section
8 Wheel flange
9 Collar
10 Face spline
11 End side
12 Transition
13 Center

The invention claimed is:

1. A wheel bearing arrangement comprising at least two rows of rolling bodies for mounting a wheel hub which can be driven with the wheel bearing arrangement by a drive element, the wheel hub being connected to the drive element, and the wheel hub and the drive element engaging into one another in a form-fitting manner by means of a pair of face splines which correspond to one another, characterized in that, at least on one face spline of the pair, a ratio of the diameter (VTK) of a toothing pitch circle of said face spline with respect to the tooth number (Z) of said face spline corresponds at least to the value 0.7, the diameter (VTK) being a difference from the radial external diameter (VDA) of the face spline and from the tooth width (ZB) of the teeth, and an imaginary circle which touches teeth of said face spline radially on the outside at the tooth root being described about the rotational axis of the wheel bearing arrangement with the external diameter (VDA), and the teeth which are spaced apart circumferentially with respect to one another extending away from the circle with the tooth width (ZB) to the inside.

2. The wheel bearing arrangement as claimed in claim 1, wherein the ratio of the diameter (VTK) of the toothing pitch circle of the face spline with respect to the tooth number (Z) of the face spline is not greater than the value 1.4.

3. The wheel bearing arrangement as claimed in claim 1, wherein the diameter (TK) of a pitch circle of at least one of the rows of rolling bodies is at least four times as great as the diameter (DKU) of the rolling bodies of identical size of said row, the pitch circle being an imaginary circle which is concentric with respect to the rotational axis of the wheel bearing arrangement and connects the centers of the rolling bodies of the row to one another circumferentially.

4. The wheel bearing arrangement as claimed in claim 1, having an inner ring which is seated on the wheel hub for one of the rows, the inner ring at least being held axially on the wheel hub by means of a collar which is shaped radially to the outside from a hollow section of the wheel hub, wherein the tooth width (ZB) is at least as great as the radial wall thickness (SQ) at the radially narrowest point of the section radially below the inner ring.

5. The wheel bearing arrangement as claimed in claim 4, wherein the tooth width (ZB) corresponds at most to 2.5 times the wall thickness (SQ).

6. The wheel bearing arrangement as claimed in claim 1, wherein the diameter (TK) of the pitch circle of at least one of the rows of rolling bodies is at most as great as 1.7 times the diameter (VTK) of the toothing pitch circle of the face spline of the pair, the pitch circle (TK) being an imaginary circle which extends concentrically with respect to the rotational axis and connecting the centers of the rolling bodies to one another circumferentially.

7. The wheel bearing arrangement as claimed in claim 6, wherein the tooth width (ZB) is at least as wide as the collar width (BN) of the collar, axially at the narrowest point.

8. The wheel bearing arrangement as claimed in claim 1, having an inner ring which is seated on the wheel hub for one of the rows, the inner ring at least being held axially on the wheel hub by means of a collar which is shaped radially to the outside from a hollow section of the wheel hub, wherein the widest tooth width (ZB) of the toothing system is at most twice the narrowest axial collar width (BN) of the collar, the collar width (BN) being viewed in the axial direction, axially from an end side of the inner ring.

9. The wheel bearing arrangement as claimed in claim 1, having an inner ring which is seated on the wheel hub for one of the rows, the inner ring at least being held axially on the wheel hub by means of a collar which is shaped radially to the outside from a hollow section of the wheel hub, characterized in that, at its narrowest point, the collar is axially at least 0.8 times as wide, axially from an end side of the inner ring, as the wall of the section is thick, radially below the inner ring at the radially narrowest point.

10. The wheel bearing arrangement as claimed in claim 1, having an inner ring which is seated on the wheel hub for one of the rows, the inner ring at least being held axially on the wheel hub by means of a collar which is shaped radially to the outside from a hollow section of the wheel hub, characterized in that the diameter (VTK) of the toothing pitch circle is at least seven times as great as the collar is axially wide at its narrowest point, as viewed axially from an end side of the inner ring.

11. A wheel bearing arrangement comprising at least two rows of rolling bodies for mounting a wheel hub which can be driven with the wheel bearing by a drive element, the wheel hub being connected to the drive element, and the wheel hub and the drive element engaging into one another in a form-fitting manner by means of a pair of face splines which correspond to one another, characterized in that the diameter (TK) of the pitch circle of at least one of the rows of rolling bodies is at most as great as 1.7 times the diameter (VTK) of the toothing pitch circle of at least one of the face splines of the pair, the pitch circle (TK) being an imaginary circle which extends concentrically with respect to the rotational axis and connecting the centers of the rolling bodies to one another circumferentially.

12. The wheel bearing arrangement as claimed in claim 11, wherein the ratio of the diameter (VTK) of the toothing pitch circle of the face spline with respect to the tooth number (Z) of the face spline is not greater than the value 1.4.

13. The wheel bearing arrangement as claimed in claim 11, wherein the diameter (TK) of a pitch circle of at least one of the rows of rolling bodies is at least four times as great as the diameter (DKU) of the rolling bodies of identical size of said row, the pitch circle being an imaginary circle which is concentric with respect to the rotational axis of the wheel bearing arrangement and connects the centers of the rolling bodies of the row to one another circumferentially.

14. The wheel bearing arrangement as claimed in claim 11, having an inner ring which is seated on the wheel hub for one of the rows, the inner ring at least being held axially on the wheel hub by means of a collar which is shaped radially to the outside from a hollow section of the wheel hub, wherein the tooth width (ZB) is at least as great as the radial wall thickness (SQ) at the radially narrowest point of the section, radially below the inner ring.

15. The wheel bearing arrangement as claimed in claim 14, wherein the tooth width (ZB) corresponds at most to 2.5 times the wall thickness (SQ).

16. The wheel bearing arrangement as claimed in claim 11, having an inner ring which is seated on the wheel hub for one of the rows, the inner ring at least being held at least axially on the wheel hub by means of a collar which is shaped radially to the outside from a hollow section of the wheel hub, wherein the widest tooth width (ZB) of the toothing system is at most twice the narrowest axial collar width (BN) of the collar, the collar width (BN) being viewed in the axial direction, axially from an end side of the inner ring.

17. The wheel bearing arrangement as claimed in claim 16, wherein the tooth width (ZB) is at least as wide as the collar width (BN) of the collar, axially at the narrowest point.

18. The wheel bearing arrangement as claimed in claim 11, having an inner ring which is seated on the wheel hub for one of the rows, the inner ring at least being held axially on the wheel hub by means of a collar which is shaped radially to the outside from a hollow section of the wheel hub, wherein, at its narrowest point, the collar is axially at least 0.8 times as wide, axially from an end side of the inner ring, as the wall of the section is thick, radially below the inner ring at the radially narrowest point.

19. The wheel bearing arrangement as claimed in claim 11, having an inner ring which is seated on the wheel hub for one of the rows, the inner ring at least being held axially on the wheel hub by means of a collar which is shaped radially to the outside from a hollow section of the wheel hub, wherein the diameter (VTK) of the toothing pitch circle is at least seven times as great as the collar is axially wide at its narrowest point, axially from an end side of the inner ring.

* * * * *